US009739475B2

(12) United States Patent
Magee et al.

(10) Patent No.: US 9,739,475 B2
(45) Date of Patent: Aug. 22, 2017

(54) COLLAR SUPPORTED PRESSURE PARTS FOR HEAT RECOVERY STEAM GENERATORS

(71) Applicant: ALSTOM Technology ltd, Baden (CH)

(72) Inventors: Jeffrey Fred Magee, Longmeadow, MA (US); Wesley Paul Bauver, II, Granville, MA (US); Van Dang, Bloomfield, CT (US); Robert William Moore, Spartanburg, SC (US)

(73) Assignee: GENERAL ELECTRIC TECHNOLOGY GMBH, Baden (CH)

( * ) Notice: Subject to any disclaimer, the term of this patent is extended or adjusted under 35 U.S.C. 154(b) by 153 days.

(21) Appl. No.: 14/689,539

(22) Filed: Apr. 17, 2015

(65) Prior Publication Data
US 2016/0305650 A1    Oct. 20, 2016

(51) Int. Cl.
| F28F 9/007 | (2006.01) |
| F22B 1/18 | (2006.01) |
| F22B 37/10 | (2006.01) |
| F22B 37/20 | (2006.01) |
| F22B 37/24 | (2006.01) |

(52) U.S. Cl.
CPC .......... *F22B 1/1815* (2013.01); *F22B 37/107* (2013.01); *F22B 37/205* (2013.01); *F22B 37/244* (2013.01)

(58) Field of Classification Search
CPC .... F22B 37/205; F22B 37/244; F22B 1/1815; F28F 2275/205; F28F 2275/00; F28F 2275/14; F16L 55/035; B21D 53/02
USPC ......... 122/510, 511, 450; 376/461; 248/68.1
See application file for complete search history.

(56) References Cited

U.S. PATENT DOCUMENTS 2,016,787 A    10/1935   Liessenberg
3,323,496 A  *  6/1967   Goldsack .............. F22B 37/141
                                                       122/510

(Continued)

FOREIGN PATENT DOCUMENTS

DE    202008001809 U1    5/2008
GB           1078494 A  *  8/1967   ............ F22B 37/205

OTHER PUBLICATIONS

Douglas L. R., "Designing HRSGS for Cycling", Power, vol. 150, No. 2, pp. 40-43, XP001245465, Mar. 1, 2006.

(Continued)

*Primary Examiner* — Gregory A Wilson
(74) *Attorney, Agent, or Firm* — GE Global Patent Operation; Stephen G. Midgley (57) ABSTRACT

Disclosed herein is a heat recovery steam generator system comprising a vestibule comprising a base plate, a roof and side walls; where the base plate is opposedly disposed to the roof; a heat exchanger space through which an exhaust gas stream is charged; where the vestibule is disposed atop a heat exchanger space; and where the vestibule comprises at least one header in fluid communication with a tube bundle; where a portion of the tube bundle is disposed in the heat exchanger space; and a support system for the tube bundle; where the support system comprises a strap that is reversibly attached to the base plate as well as to the roof of the vestibule or to a structural member in the vestibule; and where each tube of the tube bundle contacts a collar that rests on the base plate.

10 Claims, 5 Drawing Sheets

(56) References Cited

U.S. PATENT DOCUMENTS

| | | | | |
|---|---|---|---|---|
| 3,850,149 | A | * | 11/1974 | Piaskowski ............ F22B 37/20 122/494 |
| 4,286,549 | A | * | 9/1981 | Eisinger ................ F22B 37/244 122/510 |
| 4,445,463 | A | * | 5/1984 | Casper .................. F22B 1/1884 122/510 |
| 4,640,342 | A | * | 2/1987 | Appleman ............ F22B 37/206 122/510 |
| 5,219,150 | A | | 6/1993 | Denysenko et al. |
| 7,357,100 | B2 | * | 4/2008 | Waseda ................ F22B 1/1815 122/510 |
| 9,038,577 | B1 | * | 5/2015 | Lankinen .............. F22B 29/062 122/235.23 |
| 2006/0175040 | A1 | * | 8/2006 | Waseda ................... F28F 9/013 165/67 |
| 2006/0185624 | A1 | * | 8/2006 | Kinnunen ............. F22B 37/244 122/510 |
| 2007/0119388 | A1 | * | 5/2007 | Waseda ................ F22B 1/1815 122/7 R |
| 2012/0079996 | A1 | * | 4/2012 | Lankinen ............ F22B 31/0007 122/510 |

OTHER PUBLICATIONS

European Search Report and Opinion issued in connection with corresponding EP Application No. 16163716.0 on Oct. 26, 2016.

\* cited by examiner

COLLAR SUPPORTED PRESSURE PARTS FOR HEAT RECOVERY STEAM GENERATORS

TECHNICAL FIELD

This disclosure relates to collar supported pressure parts. In particular, this disclosure relates to collar supported pressure parts in steam generating devices such as boilers.

BACKGROUND

A heat recovery steam generator (HRSG) is an energy recovery heat exchanger that recovers heat from a hot gas stream. It produces steam that can be used in a process (cogeneration) or used to drive a steam turbine (combined cycle). Gas turbines with heat-recovery—steam generators (HRSGs) can be found in nearly all chemical process industries (CPI) plant. They can be operated in either the cogeneration mode or in the combined-cycle mode. In the cogeneration mode, steam produced from the HRSG is mainly used of process applications, whereas in the combined-cycle mode, power is generated via a steam turbine generator.

Figure 1A:
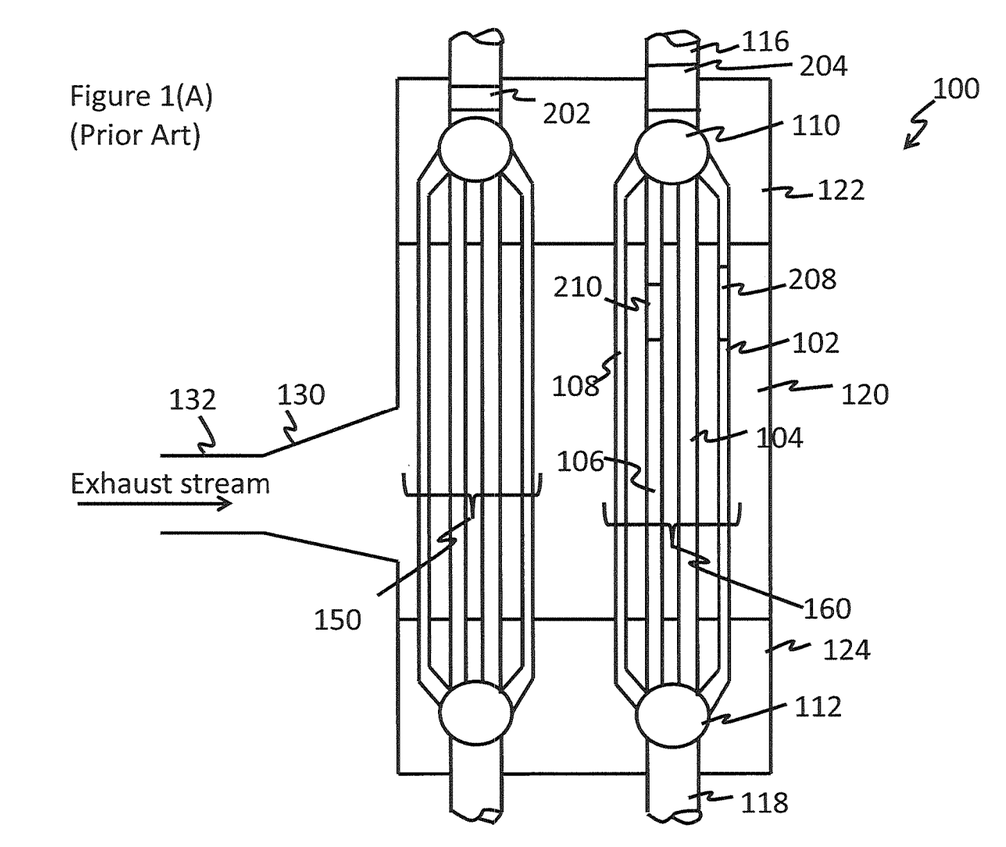
FIG. 1(A) is a prior art depiction of a side view of the HRSG and the tube bundles contained therein.
Figure 1B:
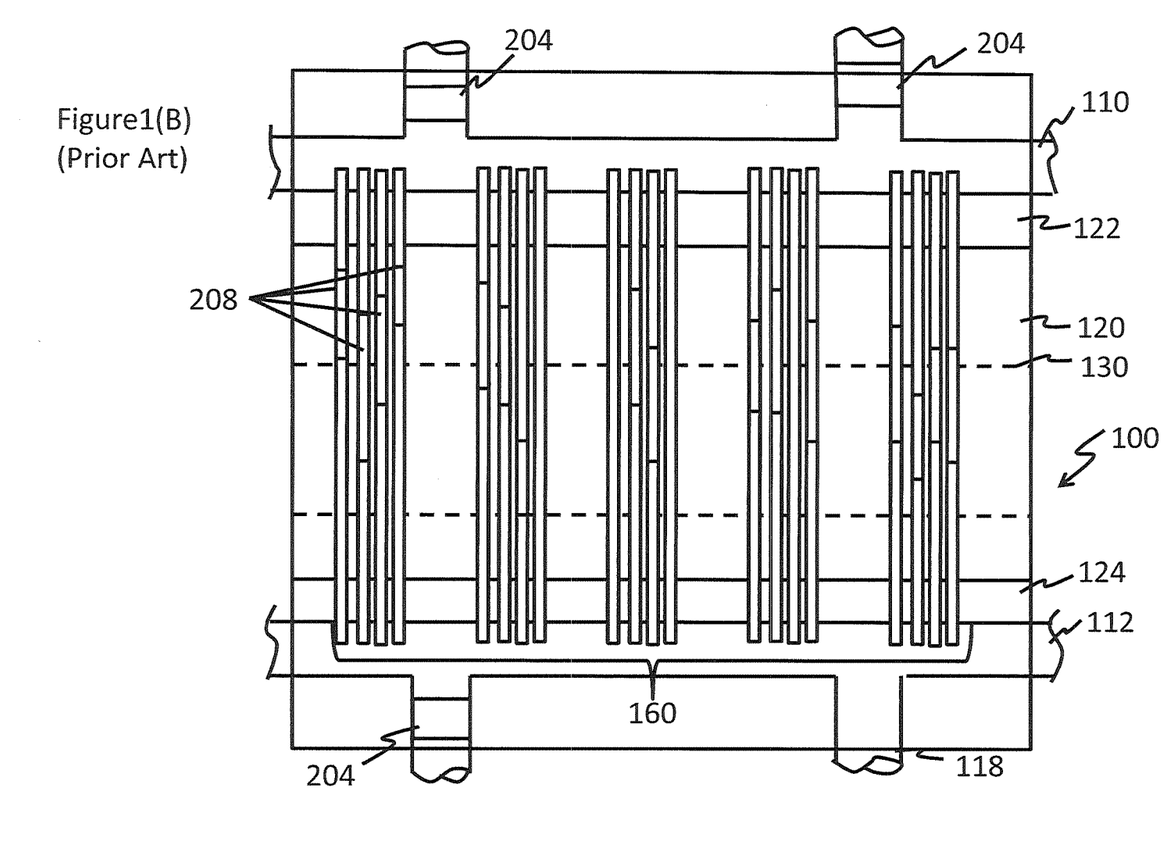
FIG. 1(B) is a another prior art depiction of another side view of the HRSG and the tube bundles contained therein.

FIGS. 1(A) and 1(B) is a cross-sectional schematic diagram that depicts one embodiment of a HRSG 100. FIG. 1(A) reflects one side view of the HRSG while the FIG. 1(B) depicts another side view of the HRSG. Both FIGS. 1(A) and 1(B) are not drawn to scale and do not have a 1:1 correspondence to each other even despite being different side views of the same design.

The heat recovery steam generator 100 is located downstream of a turbine (not shown) and receives an exhaust stream from the turbine. The exhaust stream flows through the connecting duct 132 and HRSG inlet duct 130. The exhaust stream passes through a grate-like array of tubes 150, 160 (hereinafter tube bundles) located in heat exchanger space 120 of the HRSG 100, where it transfers its heat to fluids contained in the tube bundles.

The following description applies to all tube bundles but particularly details the tube bundle 160. The tube bundles 160 comprise a first header 110 and an optional second header 112 that are contained in vestibules 122 and 124 respectively. The vestibules 122 and 124 are enclosures that lie above and below the exhaust stream flow path (the heat exchanger space 120) and therefore do not encounter the hot gases of the exhaust stream. The vestibules 122 and 124 are therefore at a lower temperature than the heat exchanger space 120. The portions of the tube bundle located in the vestibules 122 and 124 are therefore subjected to lower temperatures than the portions of the tube bundle located in the heat exchanger space 120.

The tube bundle 160 comprises a plurality of tubes 102, 104, 106 and 108 and so on that are more or less vertically disposed in the HRSG and that are in fluid communication with the headers 110 and 112 respectively. While the FIG. 1 depicts the tubes 102, 104, 106 and 108 as being located in the plane of the paper, each tube bundle comprises a plurality of tubes that extend in a direction perpendicular to the plane of the paper forming a series of tube arrays through which the exhaust stream can pass and transfer its heat. This is depicted in the FIG. 1(B). As can be seen in the FIGS. 1(A) and 1(B), a plurality of tubes 102, 104, 106 and 108 lie within the space 120 where the exhaust stream contacts them. A fluid is contained in the tube bundle 160.

In the HRSG 100 shown in the FIG. 1(A), the entire tube bundle comprising tubes 102, 104, 106 and 108 along with the second header 112 are suspended from the header 110. The entire weight of the tube bundle 160 and any supporting equipment is borne by the header 110, portions of the tube 116 that may connect the header 110 to an external header (not shown), upper portions of the tubes 102, 104 106 and 108, and by welds (202, 204) in the tube 116 or the welds (208, 210) in the tubes 102, 104, 106 and 108. As detailed below this load plays an important role in the deterioration of the welds during the life cycle of the HRSG.

The welds that bond weld sections 202, 204 in the tube 116 are generally conducted to bring together different tube sections in order to produce tubes of a variety of different shapes (not shown here). Tube sections present in the vestibules 122 and 124 are generally comprised of an expensive austenitic steel and an alloy steel. These sections of different materials are bonded together to produce the tube 116.

Fusion of austenitic to ferritic grade metal is inherently an incompatible weld and by definition a dissimilar metal weld (DMW). In general, the best practices of those skilled in the art of DMW management is to avoid thick walled DMW's by placing the DMW on a relatively small diameter tube, which in turn results in a far thinner wall than that required at location 202 and 204. Additionally, it is desirable to minimize all stresses (thermal, mechanical, static, and the like) at the DMW to ensure prolonged life. Lastly, accessibility for serviceability and repair is also useful to help monitor DMW's and maximize equipment uptime.

The prior art of FIG. 1A has some advantages in that accessibility to the DMW is good hence monitoring can be ensured. Moreover, many of the stresses acting on the DMW can be lessened by means of proper design of tube expansion loops (tube 116 can contain substantial expansion loops in proportion to the calculated stresses borne from thermal growth, and the like). What the prior art solution presented in FIG. 1A with the DMW at 202 and 204 lacks is a thin walled dissimilar weld—the current configuration often yields wall thicknesses at the DMW in excess of 25.4 mm (1 inch)—particularly for high pressure circuits. Hence, while management of mechanical stresses acting on the DMW is controllable and accessibility to the DMW's 202 and 204 depicted in FIG. 1A remains good the fundamental design shortcoming remains due to the thick walled DMW that cannot be overcome.

On the other hand, with regard to placement of the dissimilar metal welds (DMW) at location 208 and 210 (present in the space 120 where the exhaust stream contacts the tubes 102, 104, 106 and 108), the higher temperatures in the space 120 that the dissimilar weld is subjected to along with the load of the structure acting on the weld causes rapid weld deterioration. Moreover, access is significantly curtailed with this solution, hence any repair requires substantial investment. This means for all intents and purposes that if any failure is detected on any one DMW of 208 and 210 within a tube bundle a wholesale replacement is generally undertaken from an end user's perspective. It is therefore desirable to relieve the load on the DMW imparted by the tube bundles and also position the DMW in a highly accessible location; doing so reduces maintenance and down time.

SUMMARY

Disclosed herein is a heat recovery steam generator system comprising a vestibule comprising a base plate, a roof and side walls; where the base plate is opposedly disposed to the roof; a heat exchanger space through which an exhaust gas stream is charged; where the vestibule is disposed atop a heat exchanger space; and where the vestibule comprises at least one header in fluid communication with a tube bundle; where a portion of the tube bundle is disposed in the heat exchanger space; and a support system for the tube bundle; where the support system comprises a strap that is reversibly attached to the base plate as well as to the roof of the vestibule or to a structural member in the vestibule; and where each tube of the tube bundle contacts a collar that rests on the base plate.

Disclosed herein too is a method comprising discharging an exhaust gas stream into a heat recovery steam generator; where the heat recovery steam generator comprises a vestibule comprising a base plate, a roof and side walls; where the base plate is opposedly disposed to the roof; a heat exchanger space through which the exhaust gas stream is charged; where the vestibule is disposed atop a heat exchanger space; and where the vestibule comprises at least one header in fluid communication with a tube bundle; where a portion of the tube bundle is disposed in the heat exchanger space; and a support system for the tube bundle; where the support system comprises a strap that is reversibly attached to the base plate as well as to the roof of the vestibule or to a structural member in the vestibule; and where each tube of the tube bundle contacts a collar that rests on the base plate.

DETAILED DESCRIPTION

The invention now will be described more fully hereinafter with reference to the accompanying drawings, in which various embodiments are shown.

Disclosed herein is a system and a method to reduce the net load (the sum of dead load, mechanical, thermal and other forces) acting on the dissimilar welds (DMW) present in a heat recovery steam generator. Reducing the DMW load facilitates a reduction in the deterioration of welds thereby prolonging their life. This reduction of the net load on the DMW is accomplished by the use of load bearing straps that are suspended from the roof of the vestibule or from any other structural feature in the vestibule (hereinafter a structural feature of the vestibule). A collar attached and/or welded onto each tube of the tube bundle transfers the weight of the tube bundle to a platform that is suspended from the structural feature of the vestibule by a strap.

Disclosed herein is a system and a method to reduce the net load on the DMW present in a heat recovery steam generator. Reducing the DMW load facilitates a reduction in the deterioration of welds thereby prolonging their life. This reduction of the net load on the DMW is accomplished by the use of appropriate expansion loops between the collar 412 and associated downstream equipment (416, 404, 406, 402, 401, and the like) (See FIG. 2 below).

Disclosed herein too is a method to locate welds present in tubes of the tube bundle in the vestibule of the HRSG as opposed to their presence in the high temperature heat exchanger space and to thereby subject them to lower temperature which facilitates a reduction in the deterioration of welds thereby prolonging their life. Disclosed herein is a system where the welded sections of the tube bundle are located in the vestibule as opposed to being located in the heat exchanger space of the HRSG.

Disclosed herein too is a method to locate DMW's present in tubes of the tube bundle in the vestibule of the HRSG as opposed to their presence in the inaccessible heat exchanger space and to thereby facilitate enhanced access/inspectability to the DMW's thereby enhancing serviceability and overall uptime. Disclosed herein is a system where the welded sections of the tube bundle are located in the vestibule as opposed to being located in the heat exchanger space of the HRSG. Disclosed herein is a method to locate DMW's in a relatively thin walled component 416 as opposed to their presence on a thick walled tube 202 and 204 of FIG. 1A.

Disclosed herein too is a method to locate DMW's present in tubes of the tube bundle in the vestibule of the HRSG as opposed to their presence in either the inaccessible heat exchanger space or alternatively on a thick walled tube. Disclosed herein is a system where the heating surface longitudinal spacing can be optimized to a tighter and/or less tight spacing configuration than that implied with a design using headers 110 as a support device as the spacing is a function of the header diameter.

Figure 2:
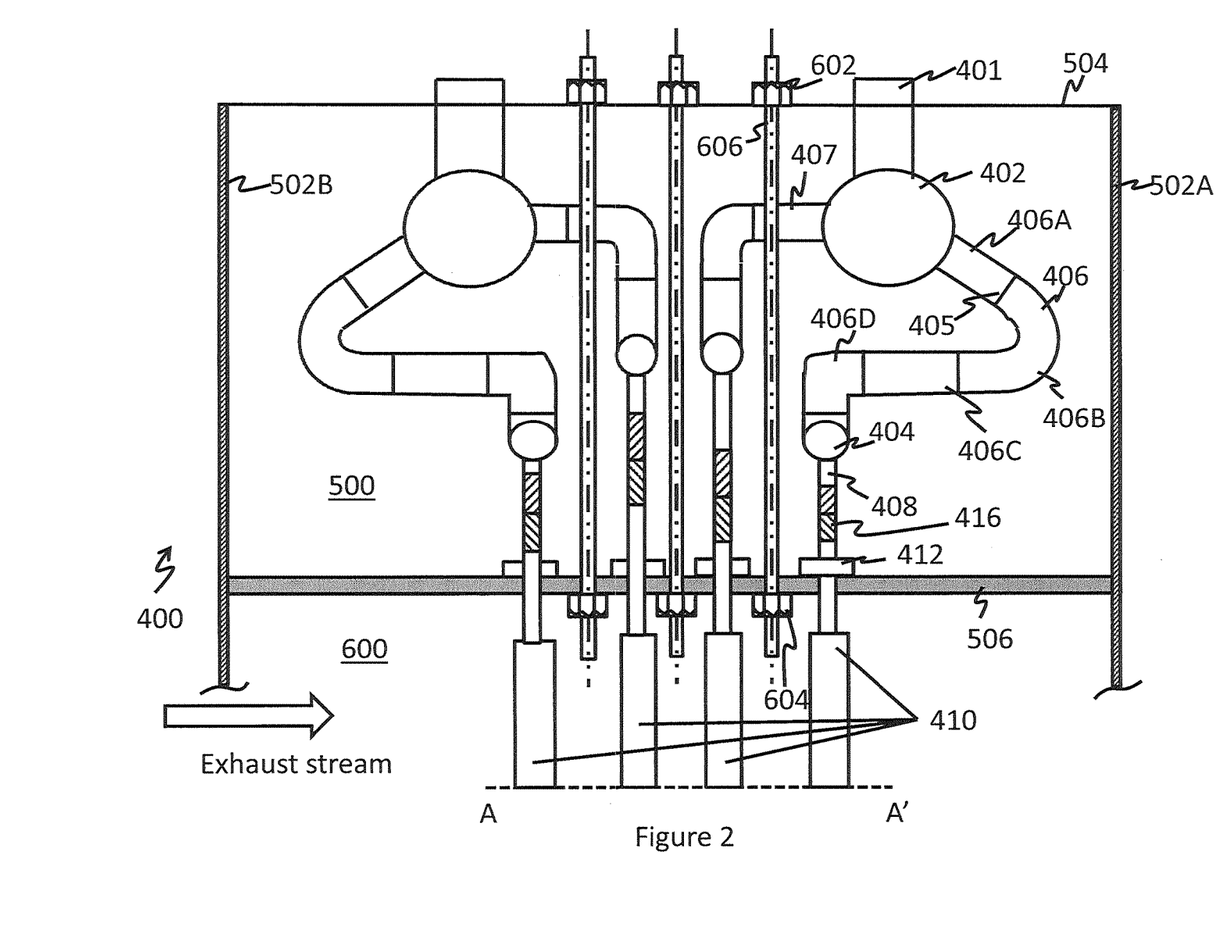
FIG. 2 depicts an exemplary portion of the vestibule of the HRSG where straps are used to support the weight of the header and associated tubing.

FIG. 2 depicts an exemplary portion of an HRSG 400 that contains a vestibule 500 disposed atop the heat exchanger section 600. A hot exhaust stream is directed through the heat exchanger section that comprises a plurality of finned tubes 410. The vestibule 500 is an enclosure defined by side walls 502A and 502B respectively, a roof 504 and a base plate 506. Disposed inside the vestibule 500 is a first header 402 that is in fluid communication with two or more primary tubes labelled 406 and 407. The first header 402 is suspended predominantly from a structural support above it (not shown) by support member 401. In particular, this structural support (not shown) is designed to allow for upward thermal growth/expansion (commonly available spring and/or variable spring hangers can suffice).

While the FIG. 2 displays the first header 402 as having two primary tubes 406 and 407, it is apparent that the header 402 may be in fluid communication with more than two primary tubes (i.e., a plurality of tubes). While the discussion below is directed to the header 402, the primary tube 406 and those tubes 408 and 410 in fluid communication with it, it applies equally to all other headers and tubes contained in the vestibule 500 and in the heat exchanger space 600. No discussion will be directed to the other headers and tubes contained in the vestibule and the heat exchanger space in the interest of brevity.

The first header 402 is in fluid communication with a second header 404 via primary tube 406. Primary tube 406 has two linear sections 406A and 406C and two elbow sections 406B and 406D. The elbow sections are used because the shape of the primary tube 406 is adjusted to make maximum and efficient use of the space in the vestibule 500 and moreover to accommodate thermal expansion considerations by means of an expansion loop.

A plurality of secondary tubes 408 is disposed from the second header 404 and are in fluid communication with it. Each secondary tube 408 is part of a tube bundle as detailed above in the FIGS. 1(A) and 1(B). In an embodiment, the portion of the secondary tube 408 below the base plate 506 has fins disposed on it. The fins are represented by reference numeral 410 and effect a better heat transfer from the exhaust stream to fluid that is transported through the secondary tubes 408. The tube sections 410 are truncated along line A-A' in the FIG. 2.

The secondary tube 408 has fixedly attached to its outer surface a collar 412 which rests on the base plate 506 thus transferring the load imparted from tubing 408 to the base plate 506 via the collar 412. The base plate 506 is fixedly attached to the walls 502A and 502B of the HRSG 400 and its weight is supported by the walls 502A and 502B and if useful is attached to the roof of the vestibule or any other structural support with support straps along its length as appropriate.

The collar 412 is attached/welded to the outer surface of the secondary tube 408 but rests freely on the base plate 506 and can be adjusted if desired. In another embodiment, the collar 412 rests of the base plate 506 but is fixedly attached to the base plate 506 by a weld and/or attachment means. In yet another embodiment, the collar 412 rests of the base plate 506 but is reversibly attached to the base plate 506 via threaded fasteners such as nuts and bolts.

The base plate 506 contains a plurality of first holes through which the bundles of secondary tubes 408 can pass from the vestibule 500 to the heat exchanger space 600 where they contact the exhaust gas stream. The base plate 506 also contains a plurality of second holes through which pass straps 606 that are suspended from the roof of the vestibule. Despite the fact that the base plate 506 contains holes for the bundles of secondary tubes 408 and for the straps 606, it becomes an air-tight barrier after the tubes and the straps are disposed through it and as a result it (the base plate 506) does not permit the exhaust stream to travel from the heat exchanger section 600 into the vestibule 500. The base plate is generally a flat metal plate of an appropriate dimension (e.g., thickness) that can withstand stresses at the temperatures of the HRSG without any deformation.

In an embodiment, the straps 606 are metal rods threaded at opposing ends and have a fastener 602 that reversibly connects the strap to the roof 504 of the vestibule 500. A second fastener 604 reversibly connects the opposing end of the strap 606 to the base plate 506. The strap 606 thus enables the weight of a portion of the base plate 506 along with the weights of the secondary tubes 408 (i.e., the tube bundle) to be borne by the roof of the vestibule or by the other structural members contained in the vestibule 500.

The straps 606 therefore transfer the weight of the secondary tubes 408 (i.e. the tube bundle) to the roof of the vestibule or to other structural members contained in or above the vestibule (not shown). As a result the stress on the dissimilar metal welds (DMW) (such as that referenced by numeral 416) is relieved. In parallel, a correspondingly appropriate expansion loop routing (406, 402 and 401) further ensures minimal stresses act on the DMW. The deviation of the load from the welds extends the life of the weld thus reducing the amount of maintenance performed on the HRSG and the down time required for such maintenance.

With reference now again to the FIG. 2, the welds on the secondary tubing 408 that were previously located in the path of the exhaust gas stream are now moved to the portion of the tubing that lies in the vestibule 500. These are depicted by reference numeral 416. Moving the weld from the high temperature zone of the heat exchanger space 600 to the lower temperature regions of the vestibule 500 prolongs weld life of welds on the secondary tubes (i.e., the tube bundles). Central also to the value of this configuration is that the DMW resides on a relatively smaller diameter tube than that of location 202 of FIG. 1A. This reduces significantly the wall thickness, an issue known to exacerbate challenges with DMW's. Moreover, the configuration greatly facilitates excellent accessibility and serviceability to the DMW by nature of the fact that it resides now in the vestibule. Moreover, replacement, if at all required, is a matter of replacing a single spool piece while leaving all upstream (tube bundles) and downstream (headers, and the like) equipment completely intact. It is important to note the any DMW failure detections can be controlled per failure as opposed to location 208 and 210 of FIG. 1A where a wholesale replacement is warranted given the inability to discretely monitor and detect failures.

Figure 3:
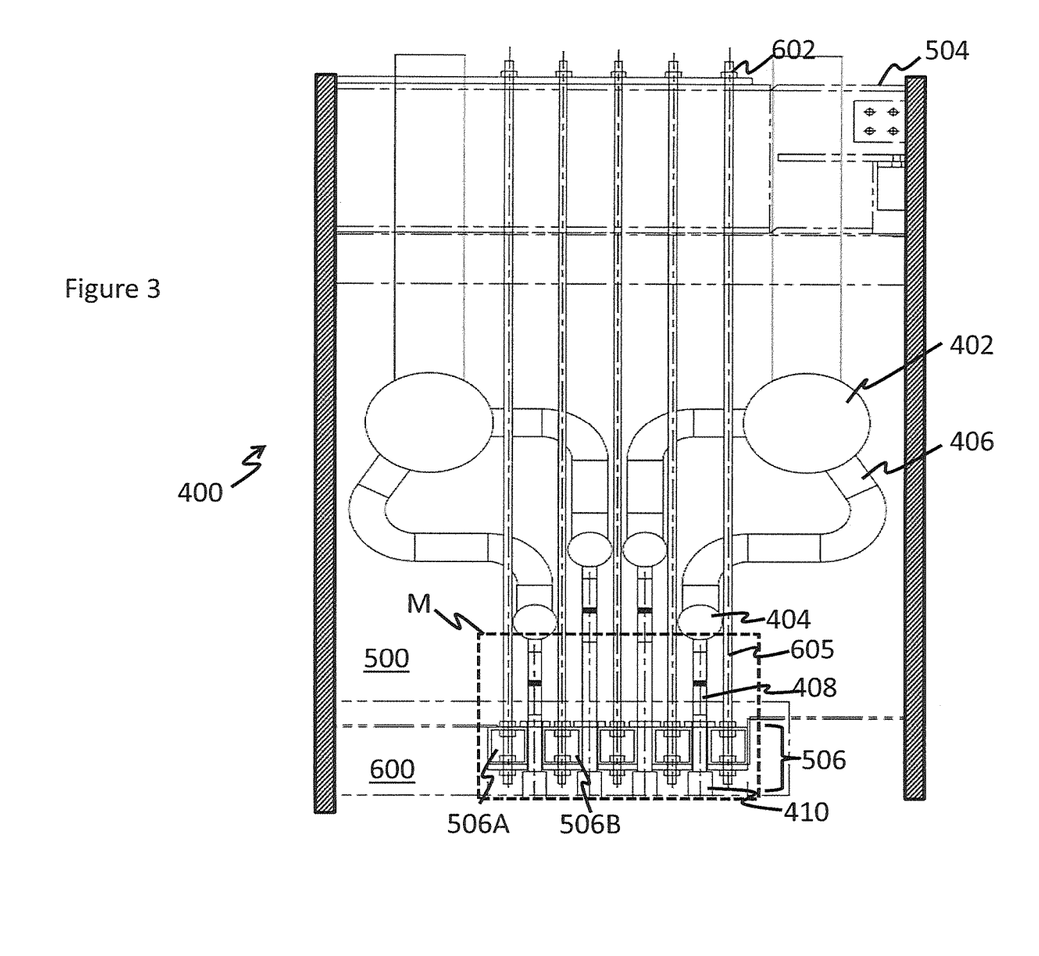
FIG. 3 is another exemplary depiction of a portion of the vestibule of the HRSG where straps are used to support the weight of the header and associated tubing and where the base plate comprises a number of hollow blocks through which the strap is disposed.

Another embodiment of the base plate 506 is depicted in the FIG. 3. In this embodiment, the base plate 506 comprises a plurality of hollow rectangular or square block sections 506A and 506B (e.g., opposed c-channels) through which pass the straps 605 that bear the weight of the tube bundles as detailed above. The secondary tubes 408 also pass through this base plate 506 as shown in the FIG. 3. The strap 605 passes through the hollow block section and is fastened by a plurality of threaded fasteners. The FIG. 4 is an expanded view of section 620 of the FIG. 3.

Figure 4:
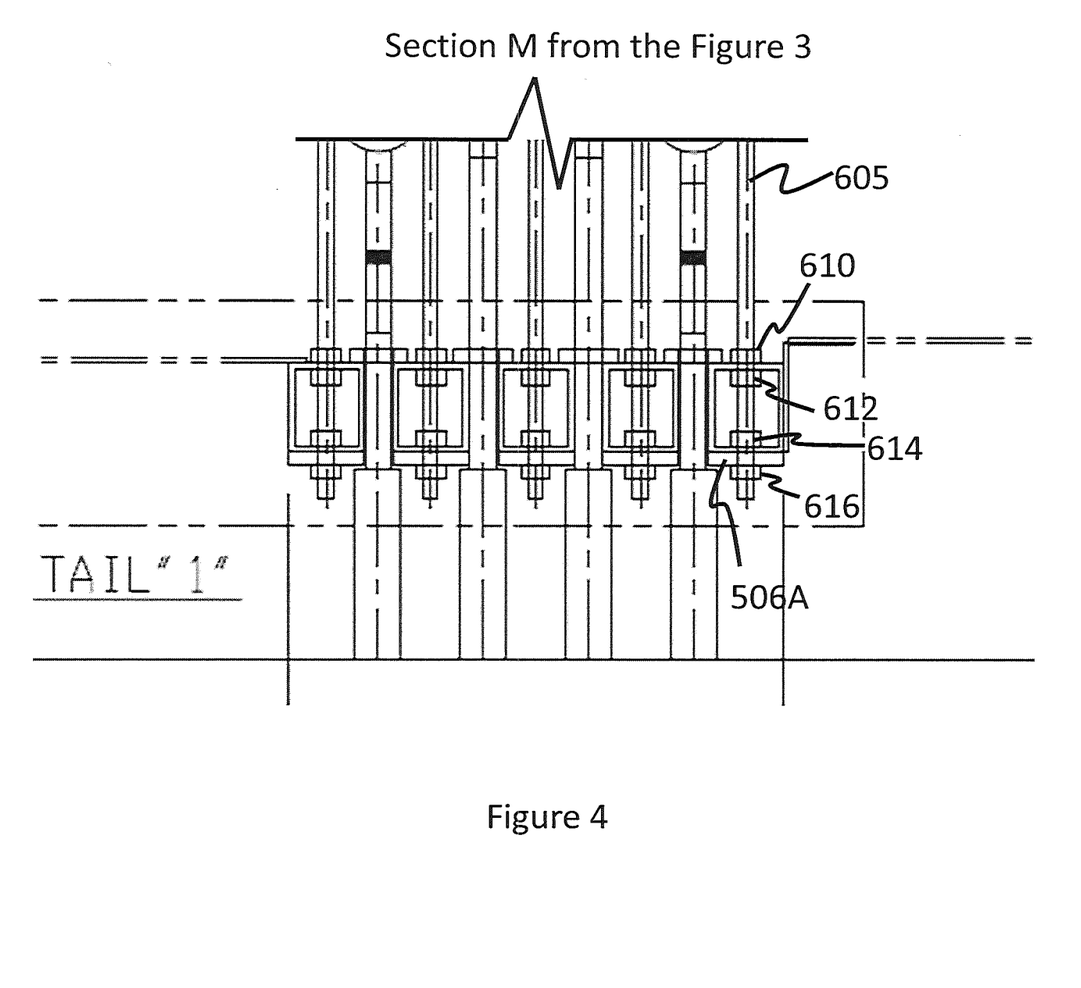
FIG. 4 is an enlarged version of the section M of the FIG. 3.

As may be seen in the FIG. 4, each strap 605 passes through the hollow block 506A and is secured by a plurality of fasteners that are disposed on opposing surfaces of the hollow block 506A. A first fastener (e.g., a nut) 610 is threaded onto the strap 605 and is disposed on an outer upper surface that bounds the hollow block 506A while a second fastener 612 is also threaded onto the strap but is disposed on an inner surface of the hollow block 506A. The outer upper surface is oppposedly disposed to the inner surface. In another embodiment, a third fastener 614 is threaded to the strap 605 on an opposing inner surface (from the previously described inner surface) of the hollow block 506A while a fourth fastener 616 is threaded to the strap on an outer lower surface that bounds the hollow block. This arrangement permits the threaded fasteners to hold the strap in place without any loosening. For example, if one pair of nuts 610 and 612 are both rotated in one direction by forces in the HRSG, then one of the nuts will loosen while the other nut will tighten thus retaining the strap in position.

The transition term comprising encompasses the transition terms "consisting of" and "consisting essentially of".

The term "and/or" includes both "and" as well as "or". For example, "A and/or B" is interpreted to be A, B, or A and B.

This invention may, however, be embodied in many different forms, and should not be construed as limited to the embodiments set forth herein. Rather, these embodiments are provided so that this disclosure will be thorough and complete, and will fully convey the scope of the invention to those skilled in the art. Like reference numerals refer to like elements throughout.

It will be understood that when an element is referred to as being "on" another element, it can be directly on the other element or intervening elements may be present therebetween. In contrast, when an element is referred to as being "directly on" another element, there are no intervening elements present. As used herein, the term "and/or" includes any and all combinations of one or more of the associated listed items.

It will be understood that, although the terms first, second, third etc. may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, a first element, component, region, layer or section discussed below could be termed a second element, component, region, layer or section without departing from the teachings of the present invention.

The terminology used herein is for the purpose of describing particular embodiments only and is not intended to be limiting. As used herein, the singular forms "a," "an" and "the" are intended to include the plural forms as well, unless the context clearly indicates otherwise. It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

Furthermore, relative terms, such as "lower" or "bottom" and "upper" or "top," may be used herein to describe one element's relationship to another element as illustrated in the Figures. It will be understood that relative terms are intended to encompass different orientations of the device in addition to the orientation depicted in the Figures. For example, if the device in one of the figures is turned over, elements described as being on the "lower" side of other elements would then be oriented on "upper" sides of the other elements. The exemplary term "lower," can therefore, encompasses both an orientation of "lower" and "upper," depending on the particular orientation of the figure. Similarly, if the device in one of the figures is turned over, elements described as "below" or "beneath" other elements would then be oriented "above" the other elements. The exemplary terms "below" or "beneath" can, therefore, encompass both an orientation of above and below.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

Exemplary embodiments are described herein with reference to cross section illustrations that are schematic illustrations of idealized embodiments. As such, variations from the shapes of the illustrations as a result, for example, of manufacturing techniques and/or tolerances, are to be expected. Thus, embodiments described herein should not be construed as limited to the particular shapes of regions as illustrated herein but are to include deviations in shapes that result, for example, from manufacturing. For example, a region illustrated or described as flat may, typically, have rough and/or nonlinear features. Moreover, sharp angles that are illustrated may be rounded. Thus, the regions illustrated in the figures are schematic in nature and their shapes are not intended to illustrate the precise shape of a region and are not intended to limit the scope of the present claims.

While the invention has been described with reference to some embodiments, it will be understood by those skilled in the art that various changes may be made and equivalents may be substituted for elements thereof without departing from the scope of the invention. In addition, many modifications may be made to adapt a particular situation or material to the teachings of the invention without departing from essential scope thereof. Therefore, it is intended that the invention not be limited to the particular embodiments disclosed as the best mode contemplated for carrying out this invention, but that the invention will include all embodiments falling within the scope of the appended claims.

The invention claimed is:

1. A heat recovery steam generator system comprising:
   a vestibule comprising a base plate, a roof and side walls, the base plate being opposedly disposed to the roof;
   a heat exchanger space through which an exhaust gas stream is charged, where the vestibule is disposed atop a heat exchanger space, where the vestibule comprises at least one header in fluid communication with a tube bundle, and where a portion of the tube bundle is disposed in the heat exchanger space; and
   a support system for the tube bundle, where the support system comprises a collar attached to at least one tube of the tube bundle and resting on the base plate, and a strap connecting the base plate to the roof or to a structural member in the vestibule;
   wherein the collar transfers a load imparted from the tube bundle to the base plate; and
   wherein the strap transfers a load from the base plate to the roof or the structural member.

2. The heat recovery steam generator of claim 1, where the collar is welded to a tube of the tube bundle.

3. The heat recovery steam generator of claim 1, where the at least one header or at least one tube of the tube bundle comprises welds where one section of tubing is welded to another section of tubing.

4. The heat recovery steam generator of claim 1, where the weight of the at least one tube bundle is transferred to the roof of the vestibule or to the structural member in the vestibule.

5. The heat recovery steam generator of claim 3, where welds located on the tubes in the tube bundle are disposed in a portion of the tube that is located in the vestibule.

6. The heat recovery steam generator of claim 1, where opposing ends of the strap are threaded.

7. The heat recovery steam generator of claim 6, where the strap is a threaded rod and where a threaded fastener contacts the threaded rod to transfer load to the roof of the vestibule or to the other structural members of the vestibule.

8. A heat recovery steam generator of claim 1, comprising:
   a vestibule comprising a base plate, a roof and side walls, the base plate being oppositely disposed to the roof;
   a heat exchanger space through which an exhaust gas stream is charged, where the vestibule is disposed atop a heat exchanger space, where the vestibule comprises at least one header in fluid communication with a tube bundle, and where a portion of the tube bundle is disposed in the heat exchanger space; and
   a support system for the tube bundle, where the support system comprises a strap connecting the base plate to the roof or to a structural member in the vestibule, and a collar attached to at least one tube of the tube bundle, wherein the collar rests on the base plate and transfers load imparted from the tube bundle to the base plate;
   where the base plate comprises a plurality of hollow block sections and where at least one strap is disposed through each hollow block section.

9. The heat recovery steam generator of claim 8, where a plurality of opposedly disposed nuts secures the at least one strap to the hollow block.

10. A method comprising:
- discharging an exhaust gas stream into a heat recovery steam generator, where the heat recovery steam generator comprises:
- a vestibule comprising a base plate, a roof and side walls, where the base plate is opposedly disposed to the roof;
- a heat exchanger space through which an exhaust gas stream is charged where the vestibule is disposed atop a heat exchanger space, where the vestibule comprises at least one header in fluid communication with a tube bundle, and where a portion of the tube bundle is disposed in the heat exchanger space; and
- a support system for the tube bundle, where the support system comprises a collar attached to at least one tube of the tube bundle and resting on the base plate, and a strap connecting the base plate to the roof or to a structural member in the vestibule;
- wherein the collar transfers a load imparted from the tube bundle to the base plate; and
- wherein the strap transfers a load from the base plate to the roof or the structural member.

\* \* \* \* \*